(12) United States Patent
Kopko

(10) Patent No.: US 6,718,771 B1
(45) Date of Patent: Apr. 13, 2004

(54) GAS TURBINE OPERATIVE AT HIGH AMBIENT TEMPERATURES

(75) Inventor: William L. Kopko, Springfield, VA (US)

(73) Assignee: Enhanced Turbine Output Holding LLC, Washington, DC (US)

( * ) Notice: Subject to any disclaimer, the term of this patent is extended or adjusted under 35 U.S.C. 154(b) by 0 days.

(21) Appl. No.: 10/070,247

(22) PCT Filed: Sep. 1, 2000

(86) PCT No.: PCT/US00/23973

§ 371 (c)(1),
(2), (4) Date: Aug. 15, 2002

(87) PCT Pub. No.: WO01/18372

PCT Pub. Date: Mar. 15, 2001

Related U.S. Application Data

(60) Provisional application No. 60/152,277, filed on Sep. 3, 1999.

(51) Int. Cl.[7] .............................. F02C 3/30; F02C 9/16; F02C 9/26

(52) U.S. Cl. .................. 60/773; 60/39.182; 60/728; 60/775

(58) Field of Search ........................ 60/39.182, 39.53, 60/728, 773, 775, 794, 772

(56) References Cited

U.S. PATENT DOCUMENTS

| 2,584,232 A | * | 2/1952 | Sedille | 60/728 |
|---|---|---|---|---|
| 3,394,265 A | * | 7/1968 | Hendrickson | 60/794 |
| 4,163,365 A | * | 8/1979 | Frutschi | 60/773 |
| 5,353,585 A | * | 10/1994 | Munk | 60/775 |

* cited by examiner

Primary Examiner—Louis J. Casaregola
(74) Attorney, Agent, or Firm—Rothwell, Figg, Ernst & Manbeck

(57) ABSTRACT

A generating plant with improved capacity at high ambient temperatures comprises a gas turbine (32) matched to a generator (26) for summer peaking conditions. The plant includes a system for limiting turbine output at lower ambient temperatures to ensure that the generator or other components are not overloaded. It also preferably includes an evaporative cooler (70) for gas turbine inlet air.

20 Claims, 9 Drawing Sheets

GAS TURBINE OPERATIVE AT HIGH AMBIENT TEMPERATURES

The application claims the benefit of the filing date of copending provisional application No. 60/152,277 filed on Sep. 3, 1999.

BACKGROUND

This invention is related generally to gas-turbine power plants, and more specifically relates to gas-turbine generation plants with increased output at high ambient temperature conditions, and is especially suited for single-shaft gas turbines.

DESCRIPTION OF THE PRIOR ART

Governments and industries from around the world have spent tens of billions of dollars in development and refinement of gas turbine power plants over the last 60 years. In addition to their widespread use in military and civilian aviation, gas turbines are an increasingly important factor in electric power generation. In 1999 sales of gas turbines for the electric power market amounted to 18 billion dollars. Gas turbines and combined-cycle plants now dominate the world market for new generation capacity.

Yet despite this tremendous investment in engineering and construction related to gas-turbine power plants, there is a basic mismatch between the capability of the turbine and the needs of the electrical power grid. A major problem is that gas-turbine capacity decreases as inlet air temperature increases, while power demand increases at high ambient temperatures. This situation means that the capability of a gas-turbine power plant is lowest at precisely the conditions when the electricity is most needed.

FIG. 1 shows how inlet air temperature affects capacity for a typical gas turbine. The normal rating condition is 59° F. and the capacity decreases at a rate of approximately 0.4% per ° F.

The conventional approach used by designers of power plants for sizing generators, transformers, power distribution equipment, and other auxiliary equipment is based on achieving maximum turbine output at low ambient air temperatures. For some turbines, the generator is sized for the lowest available ambient air, which can be −20° F. or colder. For others, heaters or other means are used to keep the inlet air temperature at about 35° F. to 40° F. to prevent ice build up inside the compressor section of the gas turbine.

The problem with this approach is that the generator and associated auxiliary equipment will output maximum power at low ambient air temperatures, while the peak generating requirement occurs at high ambient temperatures. With the advent of a competitive generating industry with real-time pricing on power generation, the conventional approach results in generator power distribution equipment that is oversized by 20% or more at summer peaking conditions. The result is a significant cost penalty.

In the days of highly regulated electric utilities, this cost penalty was simply passed on to consumers and did not affect utility profit margins. With today's competitive environment, this cost penalty is no longer acceptable.

Another factor that further aggravates this problem is the increased use of air conditioning. This is especially true for utilities in northern climates, where air conditioning usage was rare. Heat waves in recent years have made air conditioning virtually a necessity and have strained generating capacity in many cities in the northern United States. This situation combined with increasing use of natural gas for heating has created summer peaking problems for practically all utilities in the United States. Increased use of air conditioning is creating similar problems throughout the world.

The prior art has attempted many different approaches for cooling the inlet air to the turbine in order to reduce or eliminate this capacity penalty. A summary of these approaches is described in the ASME paper, "Options in Gas Turbine Power Augmentation Using Inlet Air Chilling", Igor Ondryas et al, presented at the Gas Turbine and Aeroengine Congress and Exposition, Jun. 11–14, 1990, Brussels, Belgium. Among the known alternatives for cooling are direct and indirect evaporative, electric vapor-compression, absorption, and thermal storage systems.

Of these many alternatives, direct evaporative cooling is the only approach that has seen significant application. Direct evaporative cooling has the advantage of low cost and simplicity, but the ambient wet-bulb temperature limits the possible temperature reduction. For locations in the eastern U.S. direct evaporative cooling can reduce inlet air temperatures by 10 to 20° F. Larger reductions are possible in warm, dry climates such as those of the southwestern U.S. While direct evaporative cooling is helpful, it does not allow the turbines to run at their full design capacity. After over 50 years of intensive research and development in gas turbines, no one has produced a better approach for dealing with high ambient temperatures.

Mechanical inlet air chilling is another alternative that has seen limited use. The air is typically chilled to approximately 50 degrees Fahrenheit, which gives a significant increase in capacity at high ambient temperatures. However, relatively low temperatures force the cooling system to cool the inlet below the ambient dewpoint temperature, which results in a large latent cooling load. In addition, the low cooling temperatures reduce the efficiency and capacity of the refrigeration systems used to provide the cooling. These problems increase the cost of these systems, and the large cooling power requirement offsets a significant portion of the extra turbine output realized at high ambient temperatures using this type of cooling system. Mechanical cooling systems have seen only very limited application on turbines as a result of these problems.

Gas-turbine supercharging is another approach for increasing turbine capacity. This approach is described in recent U.S. Pat. No. 5,622,044 and in the paper, "Supercharging of Gas Turbines by Forced Draft Fans With Evaporative Intercooling" by R. W. Foster-Pegg, ASME 1965. These systems use a high-pressure fan to increase the inlet air pressure to a gas turbine, combined with an evaporative cooler downstream of the fan as a way of increasing turbine capacity. This setup can give large capacity advantages, but requires additional components and complexity. In addition, the systems are quite bulky and can take large amounts of space, and designs in the prior art can be expensive for the additional power output. While my copending U.S. application Ser. No. 09/475,154 improves many of the cost and space issues with supercharging, supercharging has only seen very limited commercial application and is not suitable for many installations.

U.S. Pat. No. 5,768,884, entitled "Gas turbine engine having flat rated horsepower," describes a multishaft turbine with a variable intercooling system that maintains a constant temperature inlet air stream to a high-pressure compressor for a range of conditions. This system maintains a constant power output over a range of temperatures, but at temperatures below 59° F. the intercooler is effectively off and the output increases in response to changes in ambient temperatures. This approach has the disadvantages that the turbine capacity at lower ambient temperature is allowed to rise, which effectively sets the required size for the generator and related components and negates much of the advantage of the system. In addition the system requires a complicated and expensive arrangement of multiple spools and a heat exchanger for the intercooler. This cost and complexity means that it is not suitable for the majority of gas turbines for power generation, which use simple, single-spool configurations.

While many different ways of changing the power output of gas turbines appear in the prior art, they have not been used to address the issue of the sizing of generators at high ambient temperature. Typical approaches for reducing turbine capacity include variation in combustor output, heating inlet air, and recirculation of a portion the compressor output.

Variable compressor speed has also been used as an option for controlling turbine output. For example U.S. Pat. No. 6,003,298, entitled, "Steam driven variable speed booster compressor for gas turbine," describes a multishaft gas turbine combined-cycle plant that uses a variable-speed steam turbine to drive a low-pressure compressor. The change in compressor speed is sufficient to maintain similar turbine operating conditions with the generator running at both 50 and 60 Hz line frequency. Likewise, U.S. Pat. Nos. 4,251,987 and 3,853,432 describe variable-speed compressor arrangements using differential gearing. While these systems show additional ways of varying turbine capacity, none of them addresses the root problems with gas-turbine capacity at high ambient temperatures.

SUMMARY OF THE INVENTION

In accordance with the present invention an improved gas-turbine power plant contains a compressor that is sized relative to the turbine section so that a maximum design power output occurs at a high ambient temperature, and a control system that modulates the turbine output to prevent overload at lower ambient temperatures.

Objects and advantages
a) to maximize power output at high ambient temperatures
b) to minimize capital cost requirements
c) to minimize system complexity
d) to ensure reliable operation
e) to minimize design changes required to existing products
f) to allow retrofit of existing turbines

DESCRIPTION OF THE PREFERRED EMBODIMENT

Figure 1:
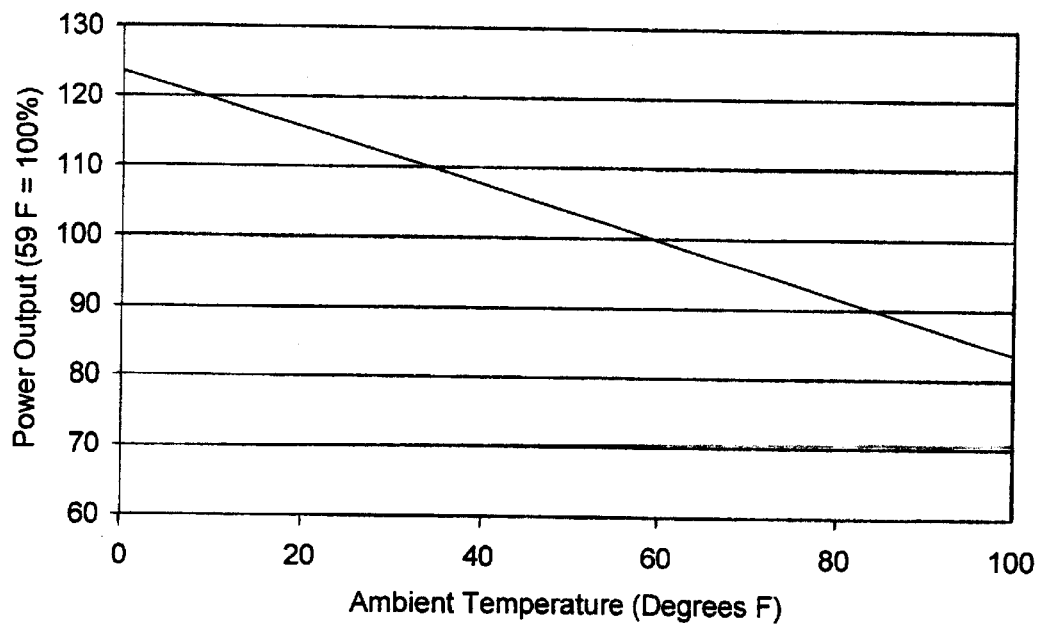
FIG. 1 is a graph which shows the effect of ambient temperature on turbine power output for the prior art.
Figure 2:
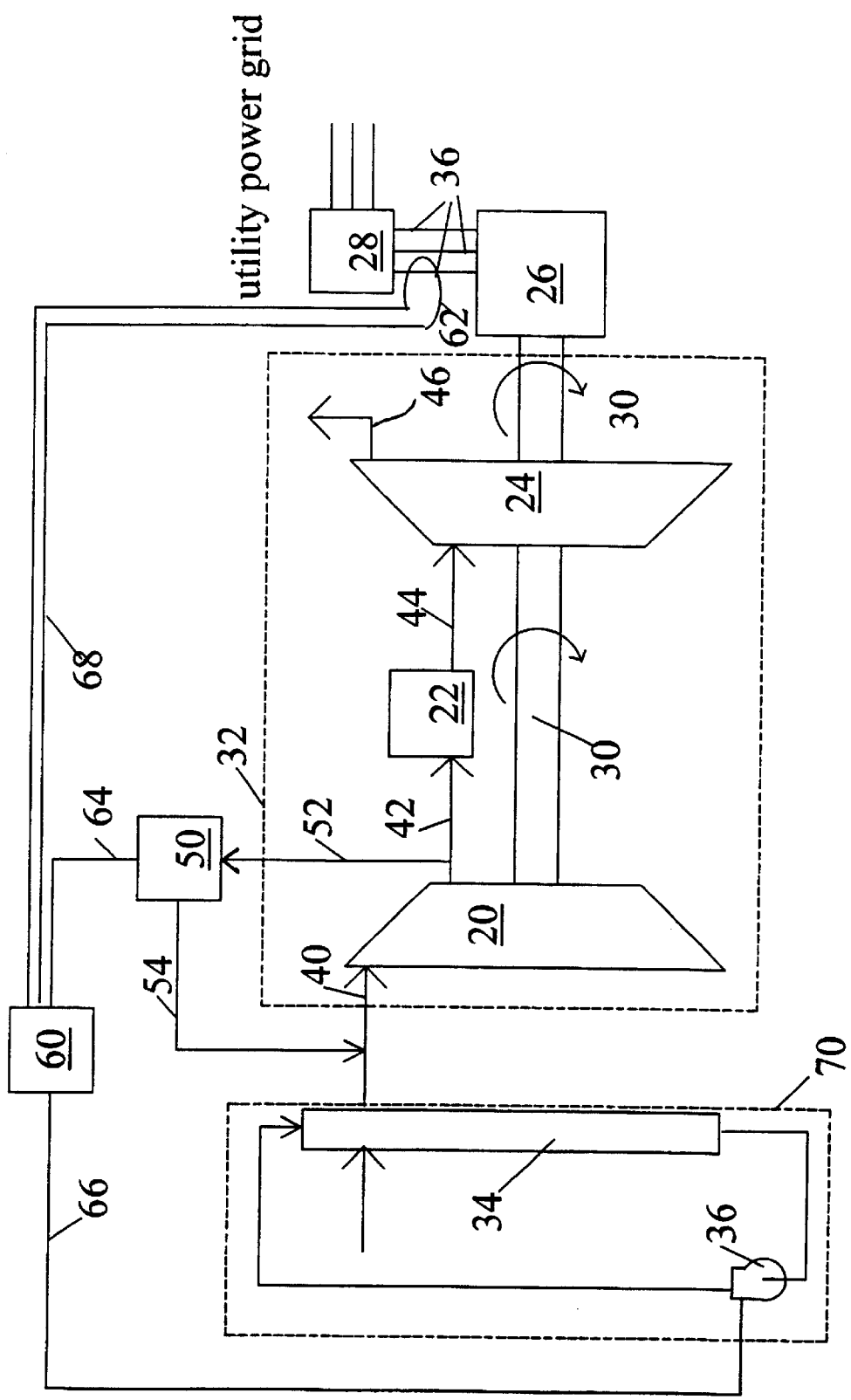
FIG. 2 is a schematic diagram of a preferred embodiment of the invention with recirculation of compressor air to control power output.

FIG. 2 shows a preferred embodiment of a gas turbine generation system according to the invention, with a recirculation arrangement around the compressor to control capacity of the gas-turbine power plant. The gas-turbine power plant 32 comprises a burner 22, compressor 20 and a turbine 24 that share a common shaft 30. A compressor inlet air stream 40 enters the compressor 20 and is pressurized to form burner inlet air stream 42. The burner 22 heats the air stream 42 and supplies it as burner outlet air stream 44 that enters turbine 24. The turbine 24 rotates in response to the heated air stream, thereby causing the shaft 30 to rotate (which exits as exhaust 46). The gas-turbine power plant would normally also include structure, bearings, controls, and other components, which are described in the prior art, and thus are not shown here. The gas-turbine power plant may also include a bottoming steam cycle or multiple-shaft arrangements.

The turbine 24 drives the compressor 20 and a generator 26, which also shares the shaft 30. The generator supplies electric power to the utility grid through conductors 36 and a transformer 28. The gas-turbine power plant may also include a supercharging fan for raising the pressure of the compressor inlet air stream as will be described in more detail later.

The preferred design for increasing the capacity of the gas-turbine power plant at high ambient temperatures would include a compressor that is larger than normal in comparison to the turbine. The objective is to size the compressor to maintain the conventional design flow and pressure to the gas turbine at higher ambient temperatures. The advantage with this approach is that the extra generating capacity at high ambient temperatures is achieved without increasing the size of the turbine, generator, or other equipment. Because of its relatively low operating temperatures, the compressor is a much less expensive component than the turbine. The only real disadvantage of changing the relative compressor sizing is that it requires a compressor/turbine combination that is specially designed for this application.

An evaporative cooler 70 is located upstream of the compressor 20. The evaporative cooler comprises an evaporative pad 34 and a water pump 36, which circulates water over the pad to create a wet surface for cooling the compressor inlet air stream 40 through evaporation of water. The evaporative cooler would normally also include a sump with a float valve to control water level and a means for bleeding off a small portion of the circulated water to prevent build up of salts. The prior art includes numerous evaporative coolers available commercially from a variety of manufacturers, so the details of the cooler design are not included in the figure. While this figure shows a direct evaporative cooler, an indirect evaporative cooler or indirect-direct evaporative cooler are also options.

A particular feature of the present invention is the sizing of the gas-turbine power plant relative to the generator and associated equipment. The generator and turbine are sized so that the generator operates at nearly full capacity at summer-peaking conditions. For example, for much of the eastern United States the summer design temperatures at peak capacity are approximately 95° F. dry-bulb and 75° F. wet-bulb. With a 90% effective evaporative cooler, the compressor inlet temperature would be 77° F. at these conditions. The generator and associated electrical auxiliaries such as the transformer would preferably be sized to output maximum power for a compressor inlet temperature of approximately 60 to 75° F. so that the generator is running at close to full load at summer-peaking conditions. By contrast, the prior art would size the generator and auxiliaries based on a compressor inlet temperature for winter conditions, which would typically be 40° F. or lower.

The present invention includes means for controlling turbine capacity so as to prevent overloading the generator at low ambient temperatures. A controller 60 receives a current signal 68 from a current sensor 62 that senses generator current. The current sensor is preferably a current transformer in which case the signal is in the form an AC current. Other possible sensors provide a voltage, optical, radio frequency output or other signal. The controller 60 provides a damper control signal 64 to a damper 50 that controls flow of a heated air stream 54 to the inlet of compressor 20. The damper is preferably capable of modulating air flow in response to a control signal and would normally include an actuator. A heated air stream 52 is drawn from the burner inlet air stream 42 and circulates through the damper 50 to the compressor inlet as a controlled air stream 54. The controller 60 also provides a pump control signal 66 to pump 36. The pump control would normally be a simple on/off control.

As the ambient air temperature drops, the current sensor 62 communicates a correspondingly higher generator current signal 68 to the controller 60. The controller responds by first turning off the pump 36 which thereby deactivates the evaporative cooler 70 and allows the compressor inlet air stream 40 to approach the ambient dry-bulb temperature. If the ambient temperature drops further, the preferred control response is to open the damper 50 by a first amount to allow flow of heated air from the compressor outlet. Further drops in ambient air temperature would result in a further opening of the damper so as to increase the amount of heated air provided to the compressor in order to limit the generator current to prevent overload.

Figure 3:
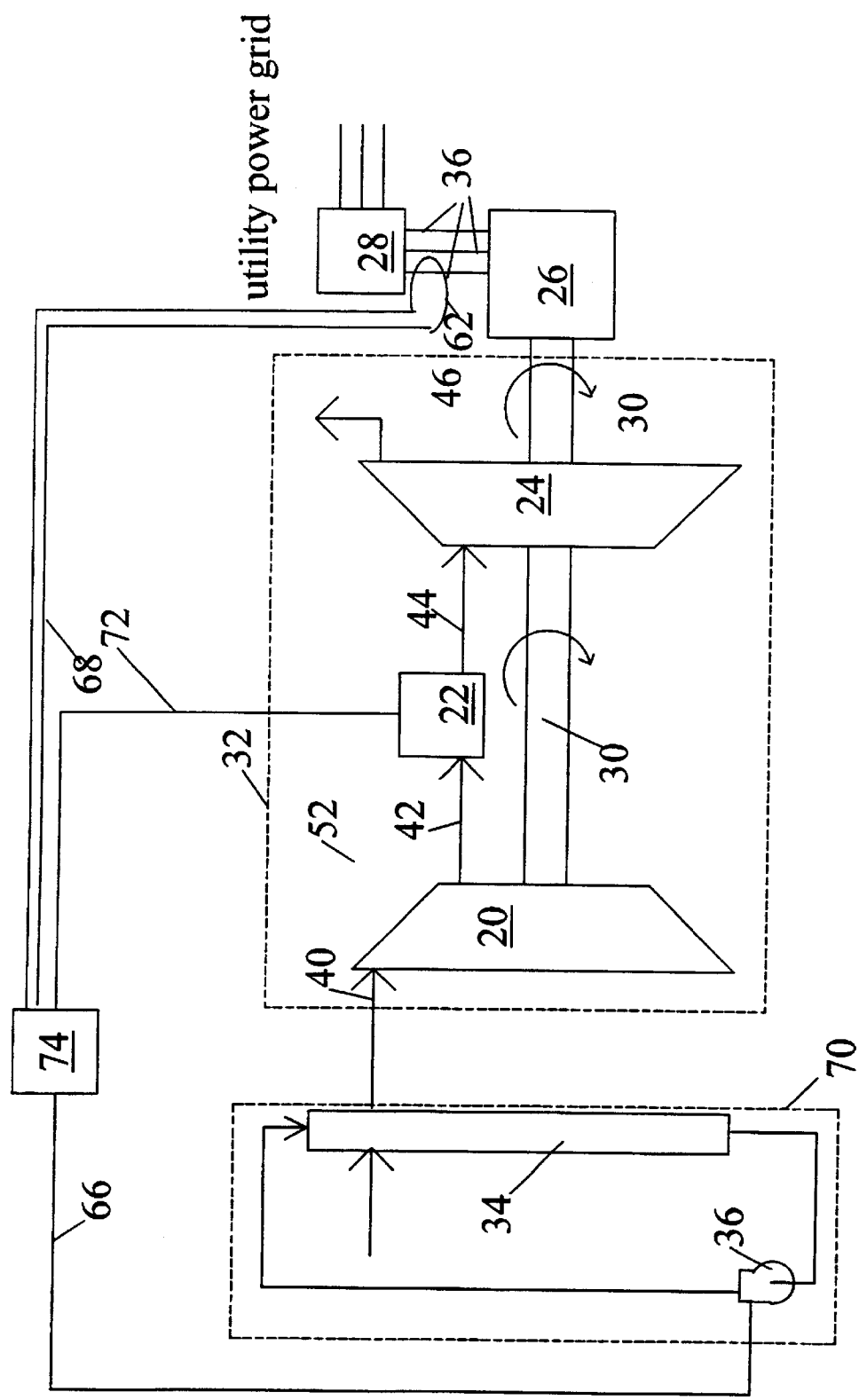
FIG. 3 is a schematic diagram of a preferred embodiment of the invention with burner control.

FIG. 3 shows another preferred embodiment that controls burner output instead of a damper, to prevent generator overload at low ambient temperatures. As in FIG. 2, a controller 74 receives a current signal 68 from a current sensor 62 that senses generator current and the controller 74 provides a pump control signal 66 to pump 36 to control operation of the pump. In this embodiment, the controller 74 provides a burner control signal 72 to the burner 22 instead of controlling a flow of heated air to the compressor inlet. This control signal regulates the burner output. The preferred arrangement is to integrate the normal operating and safety controls for the gas-turbine power plant into controller 74, but it can also be a stand-alone controller.

The control approach is similar to that of FIG. 2. As the ambient temperature drops and causes a resulting increase in generator current, the controller 74 first responds by turning off pump 36 to deactivate the evaporative cooler 70. If the generator current is still excessive (such as caused by the ambient temperature continuing to fall), the controller 74 further responds by adjusting burner signal 72 so as to reduce output of burner 22.

Figure 4:
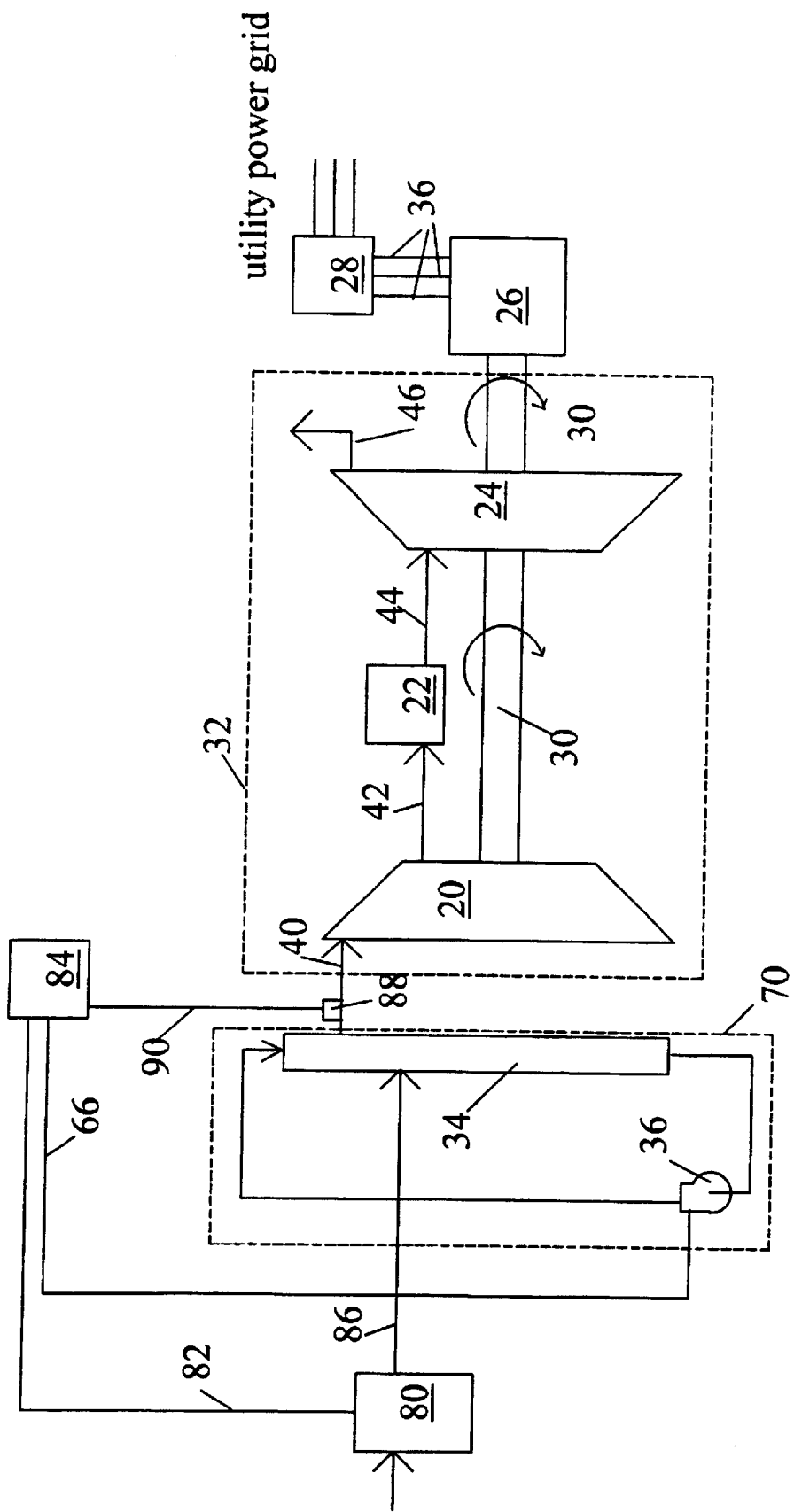
FIG. 4 is a schematic diagram of an embodiment of the invention with a heater for the turbine inlet air stream.

FIG. 4 shows a third embodiment that controls compressor inlet temperature using a heater. A controller 84 receives a temperature signal 90 from temperature sensor 88 that is located in the compressor inlet air stream 40. The controller 84 provides a heater control signal 82 to a heater 80 located upstream of the compressor inlet. The heater provides a heated air stream 86 to the compressor 20 through the evaporative cooler 70.

As the ambient temperature drops, the controller 84 actuates the heater 80 to heat the air stream being supplied to the compressor. While the preferred location for the heater is upstream of the evaporative cooler, the heater may be located between the evaporative cooler 70 and the compressor 20 if the heater is made of materials that can handle high relative humidity without excessive corrosion.

There are a number of options for the heater. One simple option is a gas burner. A second option is a boiler with a separate liquid-to-air heat exchanger. A third option is a heat exchanger that recovers heat from the turbine exhaust 46. This heat-recovery option should provide the best efficiency and is the preferred option if installed cost is not excessive. Electric heaters are a fourth option, though not preferred because of their poor efficiency. Blowing of a portion of the exhaust 46 into the compressor inlet air stream 40 is a low-cost fifth option, but may cause corrosion problems in the compressor 20 or other components. The heater should be capable of modulating its output so as to maintain an approximately constant temperature of the heated air stream 86.

The control system is based on maintaining a minimum temperature of compressor inlet air stream 40. As the ambient air temperature drops, the controller 84 responds by turning off the pump 36 to deactivate the evaporative cooler 70. If the ambient temperature drops further, the controller 84 provides a heater signal 82 to turn on heater 80 and adjust its output to maintain the required temperature of the compressor inlet air stream 40.

A more sophisticated option to controlling the evaporative cooler is to include multiple sections that can be independently controlled so as to provide multiple steps of control.

For example the evaporative cooler can be made with three sections that are arranged in a series flow configuration on the airside. Turning off an individual cooler reduces the effectiveness of the cooling and raises the air temperature. The depth of each section would preferably be unequal with the deepest section turned off first. This setup allows for roughly the same temperature rise with each step of control for the evaporative cooler.

Figure 5:
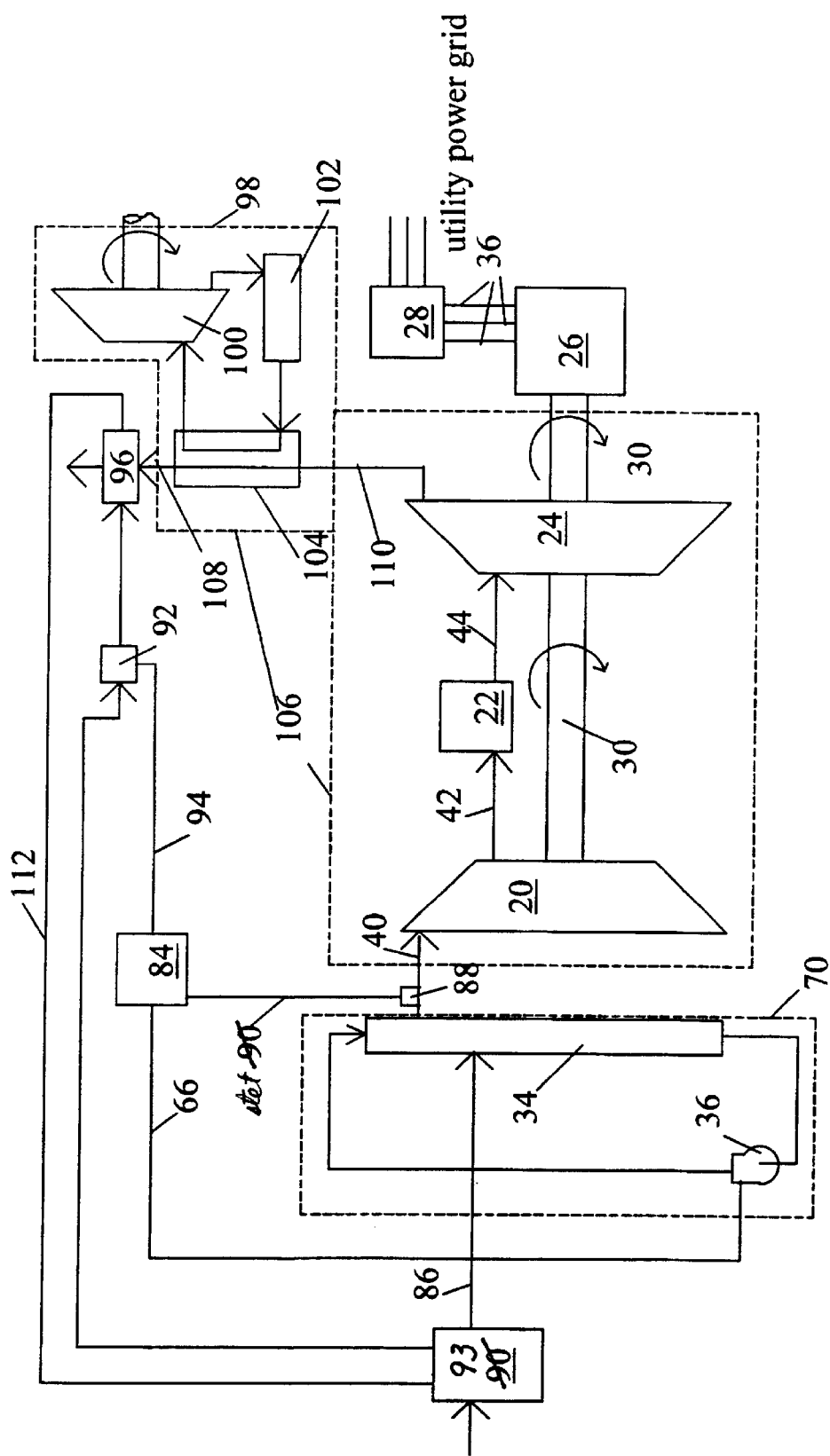
FIG. 5 is a schematic diagram of a preferred embodiment of the invention for new combined-cycle power plants.

FIG. 5 shows a fourth embodiment, which is especially suitable for use with a combined-cycle power plant. A combined-cycle gas-turbine power plant 106 includes an additional steam cycle 98 that uses exhaust 110 from the turbine 24. The steam cycle 98 comprises a boiler 104, a steam turbine 100, and a condenser 102 which are connected together to form a circuit. A liquid-to-air heat exchanger 93 is in a fluid loop with pump 92 and heat-recovery heat exchanger 96. The pump 92 circulates heat-transfer liquid 1 12 through the heat-recovery heat exchanger 96 where it receives heat from exhaust air stream 108. The pump receives a signal 94 from controller 84 to modulate flow of the heat-transfer liquid 112 to control the temperature of air stream 86. As with the embodiment in FIG. 4, the controller can turn off the evaporative cooler 70 as a first step in controlling turbine inlet temperature.

In addition to increasing generating capacity of the power plant at high ambient temperatures, there can be an efficiency advantage with this configuration. Some combined cycle power plants actually increase their efficiency slightly at higher compressor inlet temperatures. This embodiment uses waste heat from the power plant to maintain a high compressor inlet temperature, which should provide a high efficiency at low ambient temperatures.

While FIG. 5 shows a heat-transfer loop for recovering waste heat, many other configurations are possible. For example, heat from the condenser 102 could warm the inlet air stream. An air-to-air heat exchanger between the exhaust and inlet air streams is also an option.

Using the exhaust stream 108 as a heat source reqires steps to prevent corrosion. Corrosion-resistant materials are required to handle the presence of nitric acid and possibly sulfuric acid. One possibility is to use plastic materials, but plastics usually have relatively low-temperature limits. It may be desirable to mix the exhaust with ambient air to reduce the maximum temperatures to allow the use of plastics.

Direct contact liquid-to-gas heat exchange is also an option. The liquid would contain a suitable neutralizing agent such as sodium bicarbonate to prevent problems with acid condensate. Here again it may be desirable to mix the exhaust air stream with ambient air to reduce maximum operating temperatures.

These embodiments illustrate some possible configurations of the present invention. While these embodiments use either generator current or compressor inlet temperature as contropl inputs, there are many other possibilities that would achieve similar results. Control inputs may include generator power, ambient dry-bulb temperature, ambient wet-bulb temperature, shaft torque, or other inputs.

Figure 6:
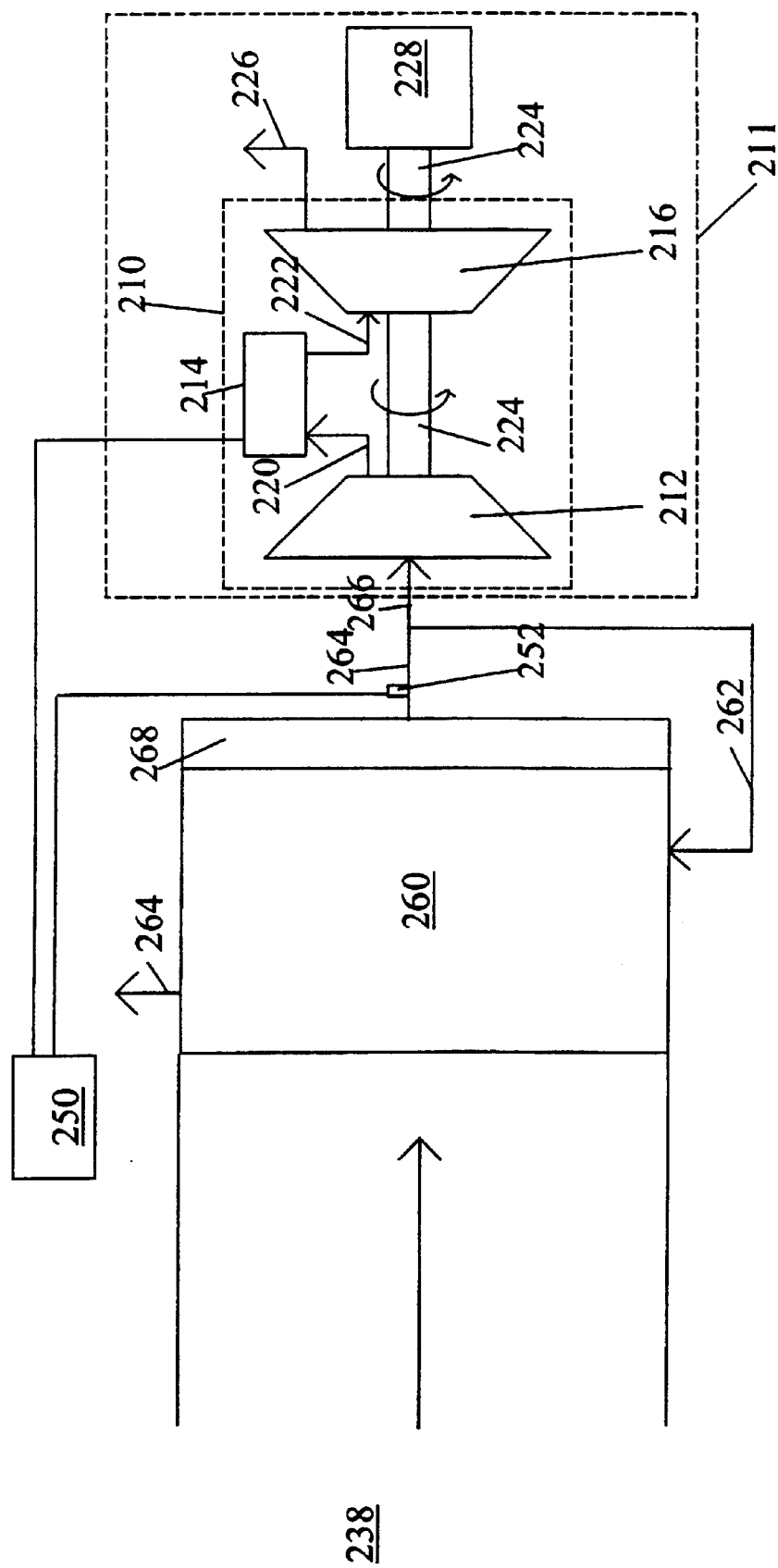
FIG. 6 is a schematic diagram of a another preferred embodiment of the invention that uses an indirect evaporative cooler.

FIG. 6 is a fifth embodiment of the invention that uses an indirect evaporative cooler that can approach the ambient dewpoint temperature. An indirect evaporative cooler 260 is located in the air stream between the ambient atmosphere 238 and the gas turbine 210. As with the previous embodiments, the gas turbine 210 and generator 228 form a gas-turbine power plant 211. Likewise the gas turbine 210 comprises a compressor 212, a burner 214, and a turbine 216. The indirect evaporative cooler 260 uses a secondary air stream 262 which is taken from a portion of the primary air stream 264 that exits a direct evaporative cooler 268. The direct evaporative cooler 268 is located between the indirect evaporative cooler 260 and the turbine 210 to further cool the air entering the turbine. The direct evaporative cooler is optional. A turbine inlet air stream 266 is formed by the remaining portion of the primary air stream 264 and enters turbine 210. The air from the secondary air stream 262 is heated and humidified inside the indirect evaporative cooler 260 and exits as exhaust air stream 264. A more complete description of the preferred indirect evaporative cooler appears in U.S. provisional application No. 60/129,552, incorporated by reference herein.

A controller 250 receives an input signal from a temperature sensor 252 that is located in the primary air stream 264 or similar location to provide a measurement of the inlet air temperature to the compressor 212. The controller provides a control output to the burner 214 to prevent overload at low ambient air temperatures.

Figure 7:
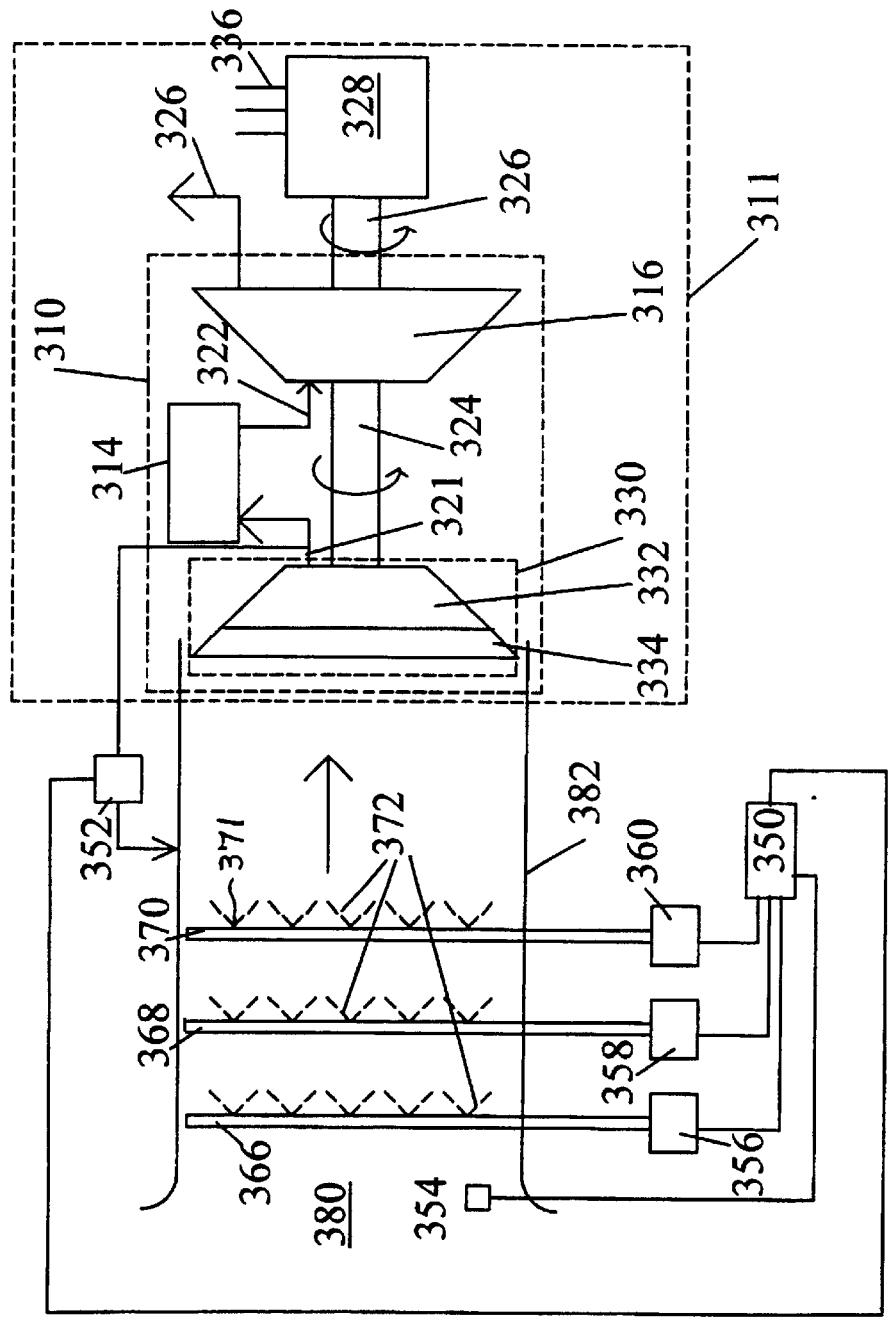
FIG. 7 is a schematic diagram of a preferred embodiment of the invention that uses a fogger on the inlet to the compressor section of the gas turbine.

FIG. 7 shows a sixth embodiment that uses foggers. A gas turbine power plant 311 comprises a gas turbine 310 and a generator 328. The gas turbine 310 comprises a compressor 330 that is driven by a turbine 316 by way of shaft 324. An output shaft 326 drives the generator 328, which supplies electrical power to an electric power transmission system 336. The compressor comprises a base compressor 332 and a low compressor stage 334. The base compressor 332 is of a design that would normally be used for the gas turbine in the prior art. The low compressor stage 334 provides an additional stage of compression. For axial flow compressors this low compressor stage 334 would typically comprise one or more rows of compressor blades.

A controller 350 receives an input signal from an ambient temperature sensor 354. The sensor 354 would preferably sense wet-bulb temperature. Alternative sensors can be enthalpy sensors or a combination of dry-bulb temperature and either relative humidity or dewpoint sensors.

As with other embodiments ambient air 380 enters the compressor inlet through a duct 382, which serves as a flow path between the atmosphere and the compressor inlet. Filters and silencers as found in the prior art may be added in this duct, although they are not necessary to operate the turbine. A compressor outlet air stream 321 flows to a burner 314 that supplies heated compressed air 322 to the turbine 322. An exhaust air stream 326 exits the turbine. A heat recovery boiler for steam cycle plant can be located in this exhaust air stream 326 to create a combined cycle plant.

The controller 350 is connected to a first, second, and third water pump 356, 358, and 360. The water pumps supply high-pressure water to corresponding first, second, and third headers 366, 368, and 370. The headers include multiple spray nozzles 371. The nozzles create a fog or mist 372. The preferred pressure for the pumps is approximately 1000 to 3000 psi, which can provide a droplet size on the order of 15 microns or less. The small droplet size prevents undesirable damage to the compressor blades.

The preferred water source for the pumps is demineralized, filtered water. This treated water prevents clogging of nozzles and prevents dissolved solids from building up on turbine components.

The controller 350 also has a control signal line connected to a valve 352 that allows a portion of the compressor outlet air stream 321 to flow to the compressor inlet. This flow increases the compressor inlet air temperature and also decreases the portion of the compressor outlet air stream that is available for the turbine. Both of these effects act to reduce turbine output. The controller modulates the position of the valve to limit turbine capacity at low ambient air temperatures.

The compressor is selected to provide a maximum design output for the gas turbine at a preselected ambient temperature. The preferred preselected ambient temperature is approximately equal to the maximum design wet-bulb temperature. For most areas of the eastern United States this value would be between 75 and 80 degrees Fahrenheit.

The maximum design output would normally correspond to the maximum capacity of the gas-turbine power plant that it can run at for extended periods of time without damaging critical components. For a new installation, this would normally be set by the capacity limits of the turbine 316. To minimize cost the generator 328 and the transmission system 336 would be sized to handle this maximum design output. For existing installations, the generator and/or the transmission capacity may already be fixed at a level below that of the turbine. In this case the minimum of the generator and transmission limits would be used to set the maximum design output. The compressor would then be selected to match this maximum design output at the preselected ambient temperature.

This configuration has an added advantage in that additional fogging can be provided beyond that which is necessary to saturate the air entering the compressor. The extra moisture is then evaporated inside the compressor, which provides a form of intercooling. This feature increases the capacity of the system by reducing the compressor work.

If this overfogging feature is used, then the preferred preselected ambient temperature for maximum design output would be lower. For example, the capacity available at typical summer design conditions (95° F. dry bulb temperature and 75° F. wet-bulb temperature) may correspond to an ambient temperature of 60° F. with no fogging. Below this temperature the controller would turn the foggers off and air would be recirculated from the compressor outlet to prevent overload of the turbine, generator, or transmission system.

While not preferred, the foggers in the embodiment in FIG. 7 can be eliminated. The preferred preselected ambient temperature for the maximum design output would then approximately the maximum design dry-bulb temperature. The compressor would be selected to provide the maximum design output at this condition and the valve 352 would allow bypass of compressor air below this temperature to prevent overload of the turbine. This setup may be necessary in applications where water for evaporative cooling is unavailable.

Figure 8:
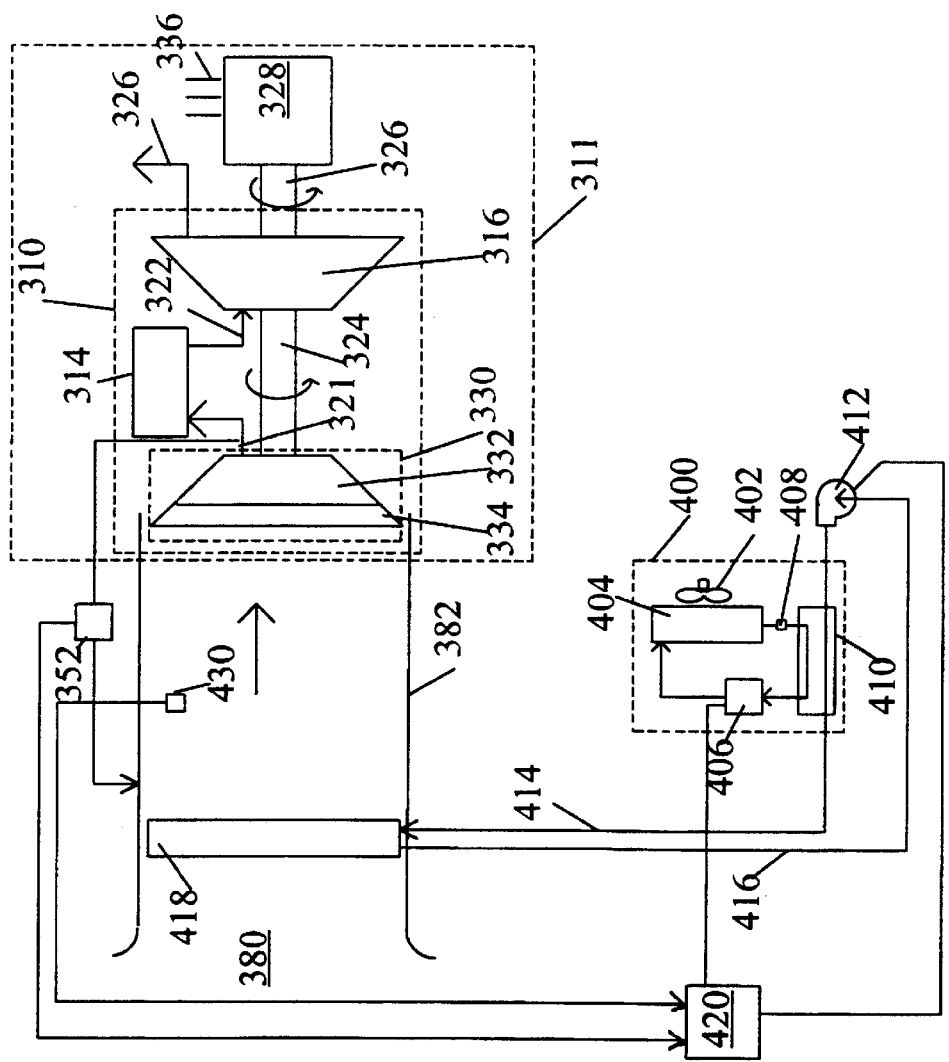
FIG. 8 is a schematic diagram of an alternative embodiment of the invention that uses a mechanical cooling system to cool compressor inlet air that is suitable for sites that lack water for evaporative cooling.

FIG. 8 shows a seventh embodiment with an air-cooled mechanical cooling system that is suitable for installations with limited water supplies. The gas-turbine power-plant 311 is the same as that described FIG. 7 and the description will not be repeated here. A chiller 400 has a refrigeration circuit formed by an air-cooled condenser 404 with a condenser fan 402, an expansion valve 408, a cooler 410, and a compressor 406. A chilled water pump 412 moves water or other liquid through the cooler 410 and a chilled water supply line 414 to a cooling coil 418 which cools ambient air 380 that enters the gas turbine 310 through the duct 382. A return chilled water line 416 brings warmed water back to the chilled water pump 412 to complete the loop.

A controller 420 receives an input signal from an inlet air temperature sensor 430 and controls the action of the chiller 400 and chilled water pump 412 and valve 352. At high ambient temperatures the controller runs the compressor 406 in the chiller at full capacity while at low temperatures it turns off the chiller and chilled water pump and actuates the valve 352 to limit turbine capacity. At intermediate temperatures the controller can modulate the cooling capacity of the chiller 400 to maintain a constant inlet air temperature to the gas turbine.

An important change from the mechanical cooling system of the prior art is the temperature of air from the cooling coil 418. The prior art typically cools the inlet air to about 50° F., which results in a large cooling power requirement. The present system on the other hand would preferably cool to a much higher temperature, roughly equal to the coincident dewpoint at design maximum ambient temperature. For moderately humid climates, such as those in much of the eastern United States, this coincident dewpoint temperature is roughly 67° F. This approach eliminates the need for removal of latent heat associated with condensing moisture from the inlet air stream. In addition the cooling system can run with a much high refrigerant evaporating temperature, which increases system efficiency and capacity. The compressor 330 would be selected to provide a maximum design capacity at this inlet air temperature. This setup gives a large capacity increase with much lower installed cost compared to conventional mechanical cooling systems.

While the preferred application for the invention is for electrical power generation, other applications are possible. For example, the turbine may drive a compressor for compressing natural gas or refrigeration applications. A key feature is that the output load is either flat or increases with higher ambient air temperature, which allows the present invention to better match the capability of the turbine to the load.

OPERATION

Figure 9:
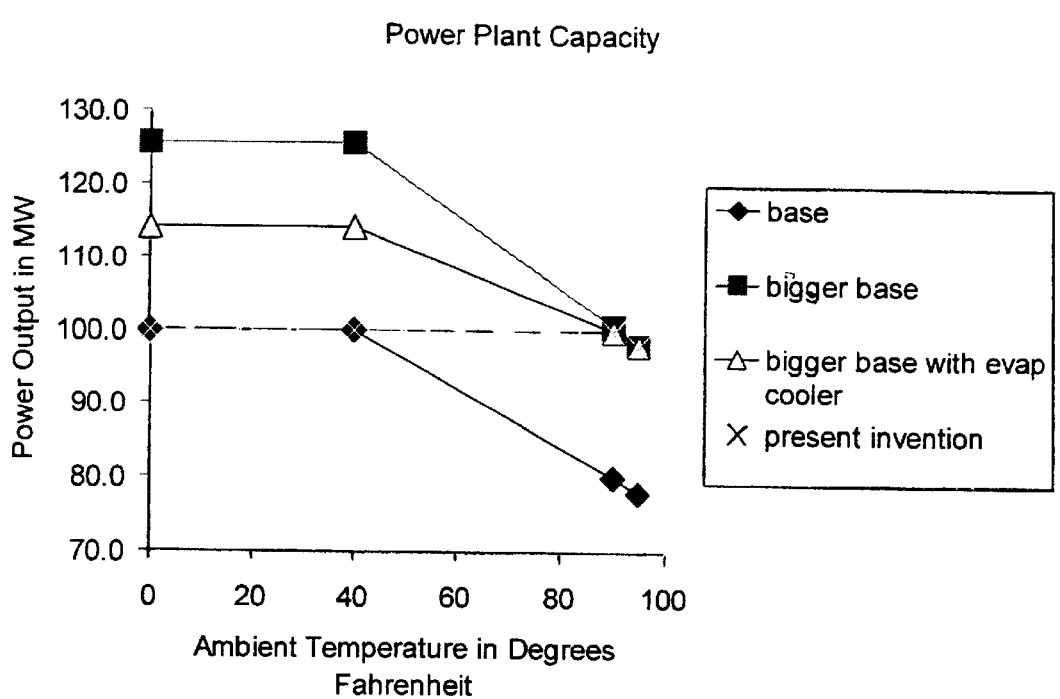
FIG. 9 is a graph that shows how turbine capacity with the present invention varies with ambient temperature.

FIG. 9 shows the capacity of the present invention compared to conventional gas-turbine systems. This figure shows that the capacity of the present invention is essentially flat, while the capacity for conventional systems drops rapidly at high ambient air temperatures. The base system is a simple-cycle turbine that gives a maximum output power of 100 MW below 40° F. but much lower capacity at higher ambient temperatures. The present invention also has the same 100 MW capacity but maintains it at high ambient temperatures. The bigger base and bigger base with evaporative cooler are simple-cycle turbines designed to match the present invention at high ambient temperatures. The bigger base with evaporative cooler takes advantage of the lower inlet temperatures available from an evaporative cooler.

The design and operation of the present invention give it a large advantage over a conventional gas-turbine system. Specifically the capacity at high ambient temperatures can be increased by over 20% compared to a base turbine system through the addition of a low-cost evaporative cooler and an additional low-pressure stage on the compressor. By comparison, the conventional approach used by designers of gas-turbine power plants would be to increase the capacity of the turbine, generator, and transmission system, in addition to the compressor. The conventional approach results in a much larger increase in cost to supply the same capacity as the present invention at high ambient temperatures.

ADVANTAGES

The advantages of the present invention are significant and numerous. Among the more important ones are:

1) Large increase in turbine capacity at high ambient temperatures,
2) Ability to achieve a large capacity increase even in humid climates,
3) Low installed cost,
4) Simple design,
5) Compact,
6) Flexible control possible,
7) Can be retrofit on existing gas turbines Overall this device represents a major breakthrough in gas-turbine technology. Its simplicity and low-cost make it extremely desirable for power-generation applications that now face major performance penalties at high ambient temperatures.

The invention having been disclosed, it will be apparent to those skilled in the art that the same may be varied in many ways without departing from the spirit or scope thereof. All such modifications are intended to be covered by the following claims.

What is claimed is:

1. A gas-turbine power plant, comprising:
   a compressor having an air inlet and an air outlet;
   a flow path between the atmosphere and the inlet of said compressor;
   a burner that receives compressed air from the outlet of said compressor;

a turbine that receives heated, compressed air from said burner, provides output power in response to receiving said heated air and which is sized in relation to said compressor so as to produce a maximum design output capacity at a preselected ambient temperature of at least 50 degrees Fahrenheit by providing an increased pressure and flow capability of said compressor relative to said turbine at said preselected ambient temperature;

an output shaft that is connected to said turbine; and means for varying the output of said turbine to limit the output of said turbine to a predetermined maximum output not greater than said maximum design output capacity for ambient temperatures below said preselected ambient temperature.

2. The gas-turbine power plant of claim 1 further comprising a generator that is driven by said output shaft.

3. The gas-turbine power plant of claim 2 wherein said compressor, said turbine, and said generator are connected together on a common shaft.

4. The gas-turbine power plant of claim 2 wherein said maximum design output capacity of the turbine corresponds to a maximum design output for said generator.

5. The gas-turbine power plant of claim 2 wherein said generator is electrically connected to an electric power transmission system.

6. The gas-turbine power plant of claim 5 wherein said maximum design output capacity of the turbine corresponds to a maximum design output capacity of said electric power transmission system.

7. The gas-turbine power plant of claim 2 further comprising an evaporative cooler that cools air entering said compressor.

8. The gas-turbine power plant of claim 7 wherein said preselected ambient temperature is approximately equal to a design maximum ambient wet-bulb temperature.

9. The gas-turbine power plant of claim 7 wherein said evaporative cooler is a fogger.

10. The gas-turbine power plant of claim 9 wherein at least a portion of fog generated by said fogger enters said compressor.

11. The gas-turbine power plant of claim 1 wherein said means for varying the output of said turbine further comprises means for varying the heat output of said burner.

12. The gas-turbine power plant of claim 1 wherein said means for varying the output of said turbine comprises means for raising the temperature of air entering said compressor.

13. The gas-turbine power plant of claim 12 wherein said means for raising the temperature of the air entering said compressor comprises means for circulating air exiting the compressor to the inlet of side of the compressor.

14. The gas-turbine power plant of claim 12 wherein said means for raising the temperature of air entering said compressor comprises a heater.

15. The gas-turbine power plant of claim 12 wherein said means for raising the temperature of air entering said compressor comprises a heat exchanger located between exhaust gases from the turbine and the air stream that enters said compressor.

16. The gas-turbine power plant of claim 1 wherein said preselected ambient temperature is approximately the maximum design ambient air temperature.

17. The gas-turbine power plant of claim 1 wherein the compressor and turbine combination comprises a base compressor and base turbine combination, and a low-pressure stage added to the base compressor.

18. The gas-turbine power plant of claim 1 further comprising a mechanical cooling system for cooling inlet to said turbine air to a temperature equal to said preselected ambient air temperature.

19. The gas-turbine power plant of claim 18 wherein said preselected ambient air temperature is approximately equal to the coincident dewpoint temperature corresponding to a maximum ambient dry-bulb temperature.

20. A method for enhancing the capacity at high ambient temperatures of a gas-turbine power plant that comprises a compressor, a burner, and a turbine, said method comprising the steps of:

providing an increased pressure and flow capability from the compressor relative to that of the turbine at ambient temperatures above about 50 degrees Fahrenheit such that a maximum design output capacity of said plant is achieved at an ambient temperature above about 50 degrees Fahrenheit, and limiting the capacity of the gas-turbine power plant at ambient temperatures below about 50 degrees Fahrenheit so that a design capacity limit of the turbine is not exceeded.

* * * * *